United States Patent
Grose et al.

(10) Patent No.: US 8,390,273 B2
(45) Date of Patent: Mar. 5, 2013

(54) SLEW RATE COMPENSATED WHEEL SPEED SENSOR SIGNAL PROCESSING METHOD AND SYSTEM

(75) Inventors: William E. Grose, Plano, TX (US); Teuta K. Williams, Dallas, TX (US); Philomena C. Brady, Corinth, TX (US); Bala Krishnan D. Achie, Richardson, TX (US); Vikram J. Mani, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 387 days.

(21) Appl. No.: 12/862,483

(22) Filed: Aug. 24, 2010

(65) Prior Publication Data
US 2012/0051492 A1    Mar. 1, 2012

(51) Int. Cl.
*G01B 7/14* (2006.01)
*G01R 33/025* (2006.01)
(52) U.S. Cl. ............... 324/207.11; 324/207.12
(58) Field of Classification Search .......... None
See application file for complete search history.

(56) References Cited

U.S. PATENT DOCUMENTS

| | | | | |
|---|---|---|---|---|
| 4,884,227 A | * | 11/1989 | Watanabe | 702/141 |
| 5,068,791 A | * | 11/1991 | Klopfleisch et al. | 701/23 |
| 5,149,177 A | | 9/1992 | Fujioka et al. | |
| 7,123,002 B2 | * | 10/2006 | Lohberg et al. | 324/207.11 |

* cited by examiner

*Primary Examiner* — Vinh Nguyen
(74) *Attorney, Agent, or Firm* — Alan A. R. Cooper; Wade J. Brady, III; Frederick J. Telecky, Jr.

(57) ABSTRACT

Anti-lock and intelligent braking systems have become ubiquitous in modern vehicles, which employ wheel speed sensors or WSSs. These WSSs generally uses current-domain signals (transmitted through power wires) to reduce the size of the vehicle's wiring harness, but because a vehicle is an inherently noisy environment, mixed signal circuit or MSC (used to decode these signals for a microcontroller) should be able to filter out or compensate for noise. However, traditional MSCs have been plagued with problems, partly due to errors in time base measurement due to noise (as well as other factors). Here, an MSC is provided that accurately calculates a wheel speed pulse width (which is used for time base measurements) by observing the wheel speed pulse as it passes through several thresholds.

21 Claims, 5 Drawing Sheets

SLEW RATE COMPENSATED WHEEL SPEED SENSOR SIGNAL PROCESSING METHOD AND SYSTEM

TECHNICAL FIELD

The invention relates generally to control circuitry for anti-lock braking systems and, more particularly, to wheel speed measurement circuitry.

BACKGROUND

Figure 1:
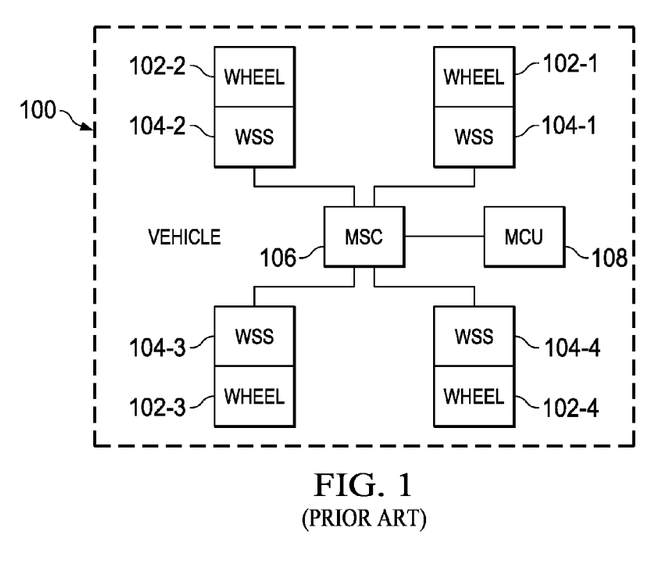
FIG. 1 is a block diagram of a conventional vehicle employing an anti-lock braking system.

Referring to FIG. 1 of the drawings, reference numeral 100 generally designates a vehicle that employs an anti-lock braking system. Vehicle 100 generally comprises wheels 102-1 to 102-4, wheel speed sensors (WSS) 104-1 to 104-4 (which are each associated with wheels 102-1 to 102-4, respectively), a mixed signal circuit (MSC) 106, and a microcontroller (MCU) 108. In operation, the MSC 106 provides power to each of the WSSs 104-1 to 104-2 through power cables (which can measure in the tens of feet), and the WSSs 104-1 to 104-2 provide data regarding wheel speed, direction, and so forth to MSC 106, which decodes the data for processing by MCU 106.

Figure 2:
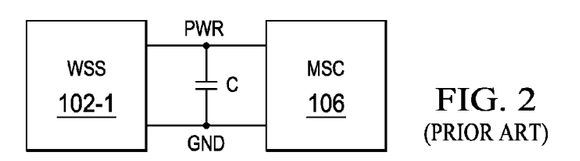
FIG. 2 is a block diagram of a portion of the anti-lock braking system of FIG. 1.

As a result of the complexity of wiring harnesses in vehicles (namely, the sheer volume of wires in the wiring harnesses), there is a desire to reduce the number of wires, which is the case with WSSs 102-1 to 102-4. As can be seen in FIG. 2, communications between WSS 102-1 (for example) and MSC 106 is performed through a power cable (which generally comprises a power wire PWR, a ground wire GND, and a capacitor C). Generally, each of the power wire PWR and ground wire GND is coupled to power and ground terminals (respectively) of each of the WSS 102-1 and MSC 106). Because the power wire PWR serves multiple purposes (i.e., providing power and communications), the communication of data is performed through the use of current-domain signals.

Figure 3:
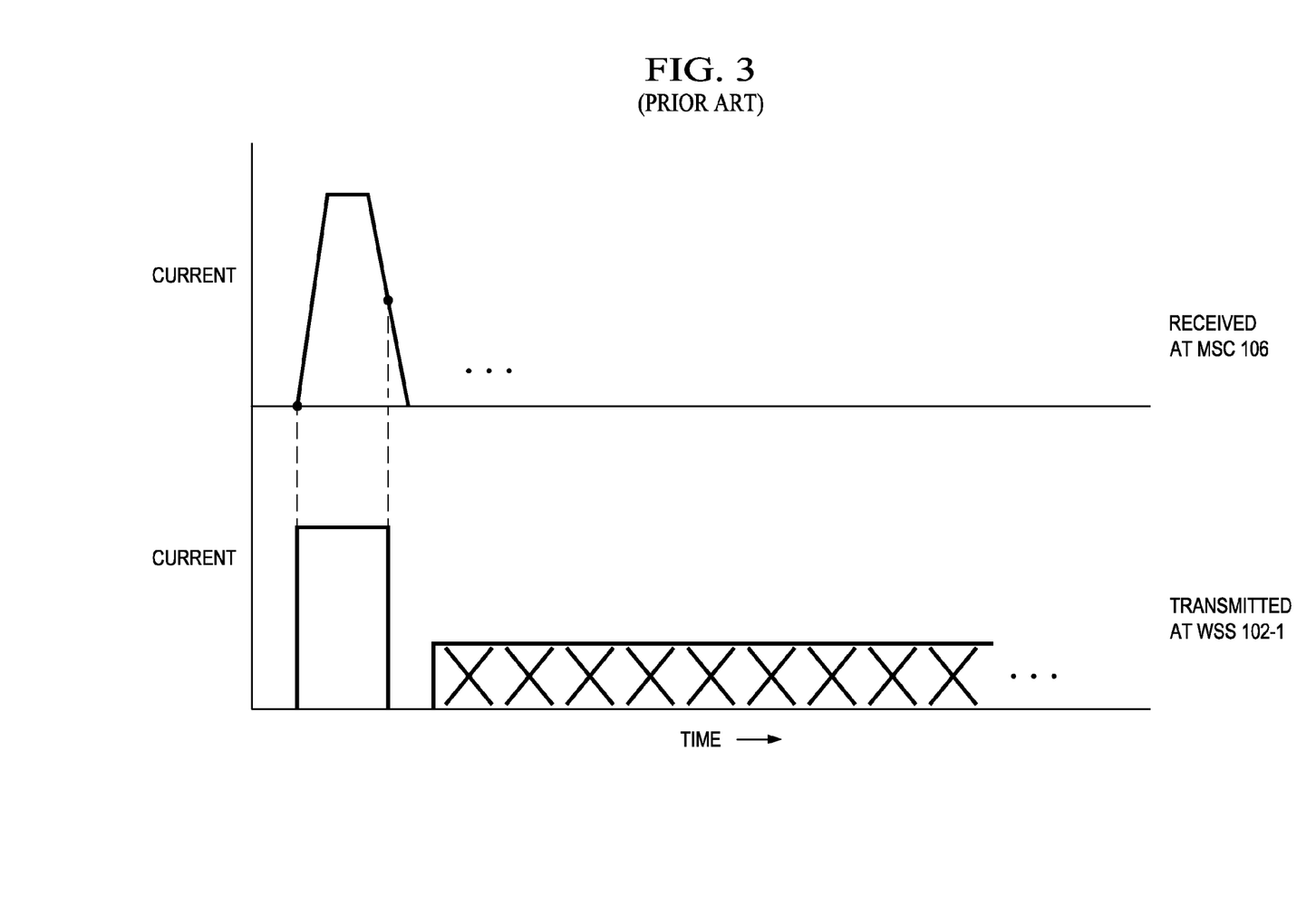
FIG. 3 is a timing diagram illustrating the operation of the portion of the anti-lock braking system shown in FIG. 2.

Turning to FIG. 3, an example of these current-domain communication signals can be seen. To transmit data corresponding to wheel speed and other information, the current-domain signals (which are Manchester encoded) use multiple current levels. For example, for wheel speed data, current levels between 14 mA and 28 mA are employed, while other encoded data may use current levels between 7 mA and 14 mA. As can be seen from FIG. 3, however, the noisy environment of a vehicle (as well as noise reducing elements, like capacitor C) can severely degrade these current-domain signals, resulting in errors in determining the actual pulse width of a wheel speed pulse, which affect time base measurements. Therefore, there is a need for an improved measurement system and method.

Another conventional system is: U.S. Pat. No. 5,149,177.

SUMMARY

A preferred embodiment of the present invention, accordingly, provides an apparatus comprising: a power terminal; sensing circuitry that is coupled to the power terminal, wherein the sensing circuitry receives a plurality of sensor signal pulses through the power terminal, wherein the sensor signal pulses are in the current-domain; a state machine that is coupled to the sensing circuitry, wherein the state machine and state machine compare a sensor signal pulse of the plurality of sensor signals pulses to a plurality of thresholds to generates a first control signal and a second control signal; a pulse width counter that is coupled to the state machine, wherein the pulse width counter determines a width of the sensor signal pulse based at least in part on at least one of the first and second control signals; a error counter that is coupled to the state machine, wherein the error counter determines an error in the width of the sensor signal pulse based at least in part on one of the first and second control signals; and a pulse width calculator that is coupled to the pulse width counter and the error counter, wherein the pulse width calculator determines a speed pulse width by removing at least a portion of the error from a width count.

In accordance with a preferred embodiment of the present invention, the plurality of thresholds further comprises a plurality of threshold voltages, and wherein the sensing circuitry further comprises: a current-to-voltage (I-to-V) converter that converts the sensor signal pulses into the voltage-domain from the current-domain; and a plurality of comparators that are each coupled to the I-to-V converter and that each receive at least one of the plurality of threshold voltages.

In accordance with a preferred embodiment of the present invention, the plurality of thresholds further comprise a plurality of threshold currents, and wherein the sensing circuitry further comprises a current comparator circuit that receives the plurality of sensor signal pulses and each threshold current.

In accordance with a preferred embodiment of the present invention, the pulse width counter further comprises: a plurality pulse width counter multiplexers coupled in series with one another in a sequence, wherein at least one of the plurality of pulse width counter multiplexers is controlled by the first control signal, and wherein at least one of the plurality of pulse width counter multiplexers is controlled by the second control signal; and a first counter that is coupled to the last first and last pulse width counter multiplexers of the sequence.

In accordance with a preferred embodiment of the present invention, the first counter is an 8-bit counter.

In accordance with a preferred embodiment of the present invention, the sequence further comprises a first sequence, and wherein the error counter further comprises: a plurality of error counter multiplexers that are coupled in series with one another in a second sequence, wherein the first error counter multiplexer of the second sequence is coupled to the first counter, and wherein at least one of the plurality of error counter multiplexers is controlled by the first control signal; and a second counter that is coupled to the last error counter multiplexer of the second sequence.

In accordance with a preferred embodiment of the present invention, the second counter is a 4-bit counter.

In accordance with a preferred embodiment of the present invention, the pulse width calculator further comprises: a pulse width calculator multiplexer that is coupled to the second counter and controlled by the second control signal; and a register that is coupled to the pulse width calculator multiplexer and the first counter.

In accordance with a preferred embodiment of the present invention, an apparatus is provided. The apparatus comprises a plurality of wheel speed sensors, wherein each wheel speed sensor has a power terminal and a ground terminal, and wherein each of the wheel speed sensors is adapted to generate a wheel speed pulse in the current-domain through its power terminal; a plurality of power cables, wherein each power cable is coupled to the power and ground terminals of at least one of the wheel speed sensors; and a mixed signal circuit having: a plurality of power terminals that are each coupled to at least one of the power cables so as to receive the wheel speed pulse from each wheel speed sensor; sensing circuitry that is coupled to each power terminal from the mixed signal circuit; a state machine that is coupled to the sensing circuitry, wherein the state machine and sensing circuitry compare each wheel speed pulse signal pulse to a plurality of thresholds to generates first control signal and a second control signal corresponding to each wheel speed pulse; a pulse width counter that is coupled to the state machine, wherein the pulse width counter determines width of each wheel speed pulse based at least in part on at least one of its first and second control signals; a error counter that is coupled to the state machine, wherein the error counter determines an error in the width each wheel speed pulse based at least in part on one of its first and second control signals; and a pulse width calculator that is coupled to the pulse width counter and the error counter, wherein the pulse width calculator determines a speed pulse width for each wheel speed pulse by removing at least a portion of its error from its pulse width count.

In accordance with a preferred embodiment of the present invention, a method is provided. The method comprises receiving a signal that is in the current-domain; comparing the signal to a first threshold and a second threshold; starting a first counter and a second counter when the signal becomes greater than the first threshold; stopping the second counter when the signal becomes greater than the second threshold to generate an error in a pulse width; stopping the first counter when the signal becomes when falls below the second threshold to generate the pulse width; and determining a speed pulse width by removing the error from the pulse width.

In accordance with a preferred embodiment of the present invention, the first and second thresholds further comprise first and second threshold voltages, respectively, and wherein the step of comparing further comprises converting the signal from the current-domain to the voltage domain.

In accordance with a preferred embodiment of the present invention, the first and second thresholds further comprise first and second threshold currents, respectively.

In accordance with a preferred embodiment of the present invention, the pre-loading the first counter with a predetermined value following the step of stopping the first counter.

In accordance with a preferred embodiment of the present invention, the first threshold corresponds to 14 mA, and wherein the second threshold corresponds to 28 mA.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 4:
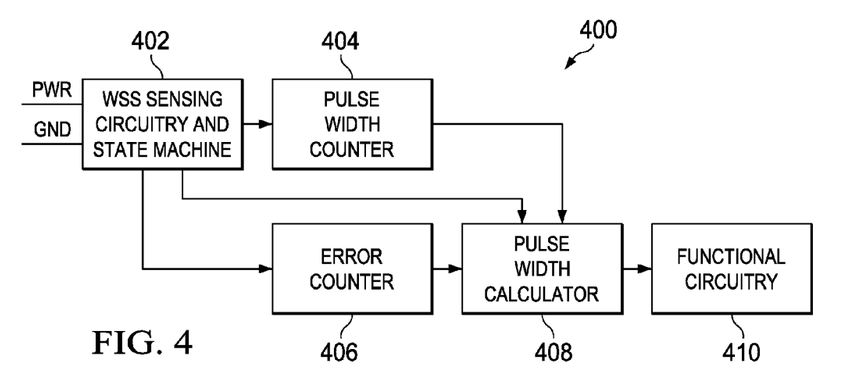
FIG. 4 is a block diagram of an example of an MSC in accordance with a preferred embodiment of the present invention.

Turning to FIG. 4, a MSC 400 in accordance with a preferred invention can be seen. Typically, MSC 400 is an integrated circuit or IC that replaces the MSC 106 of FIGS. 1 and 2. MSC 400 generally comprises a WSS analog sensing circuitry and state machine 402, a pulse width counter 404, an error counter 406, pulse width calculator 408, and functional circuitry 410. Typically, in operation, the WSS analog sensing circuitry and state machine 402 is coupled to the power wire PWR and ground wire GND for each WSS (i.e., 102-1 to 102-4). The WSS analog sensing circuitry and state machine 402 is generally able to generate control signals by comparing the current measurements from the power wires PWR to thresholds that correspond to predetermined current values (i.e., 7 mA, 14 mA, and/or 28 mA). Based on these control signals, the pulse width counter 404 determines an overall or wheel speed pulse width, while error counter 406 determines the error for the overall or wheel speed pulse width. With the wheel speed pulse width and error, the pulse width calculator 408 is able to output a speed width pulse to the functional circuitry 410, which corresponds to an accurate representation of the wheel speed pulse output from a WSS (i.e., WSS 102-1).

Figure 5A:
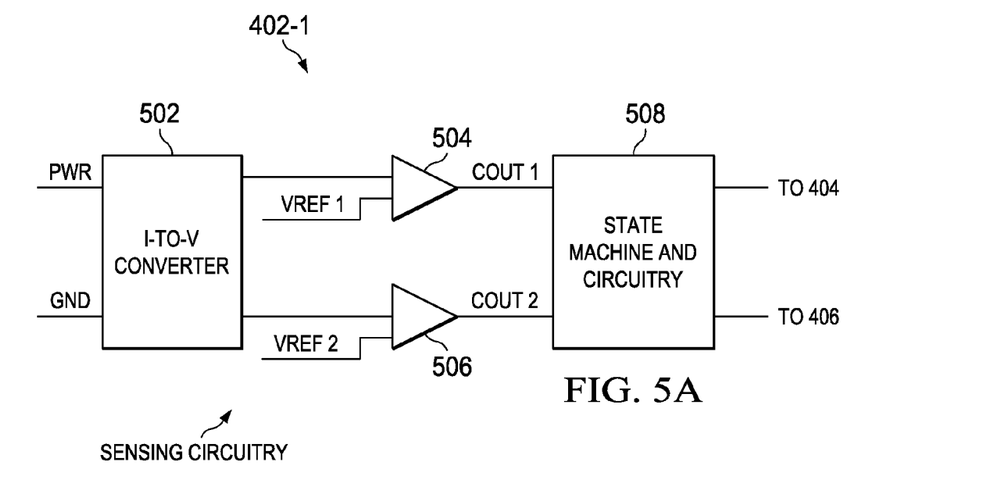
FIGS. 5A and 5B are block diagrams of examples of the connectivity between the analog sensing circuitry and state machine circuitry of FIG. 4.

Looking to FIG. 5A, an example configuration for WSS analog sensing circuitry and state machine 402 can be seen (which are referred to as 402-1). WSS analog sensing circuitry and state machine 402-1 performs comparisons in the voltage-domain, as opposed to the current domain. To accomplish this, WSS analog sensing circuitry and state machine 402-1 uses a current-to-voltage (I-to-V) converter 502 to convert the current-domain signals on the power wire PWR to voltage-domain signals. Then, to generate the signals COUT1 and COUT2 (which can be seen in FIG. 9 and which correspond to thresholds for a wheel speed pulse), the voltage-domain signals from I-to-V converter 502 are compared to reference voltages VREF1 and VREF2 (which correspond to current threshold values, such as 14 mA or 28 mA). Each of these signals COUT1 and COUT2 are then provided to the state machine circuitry 508.

Figure 5B:
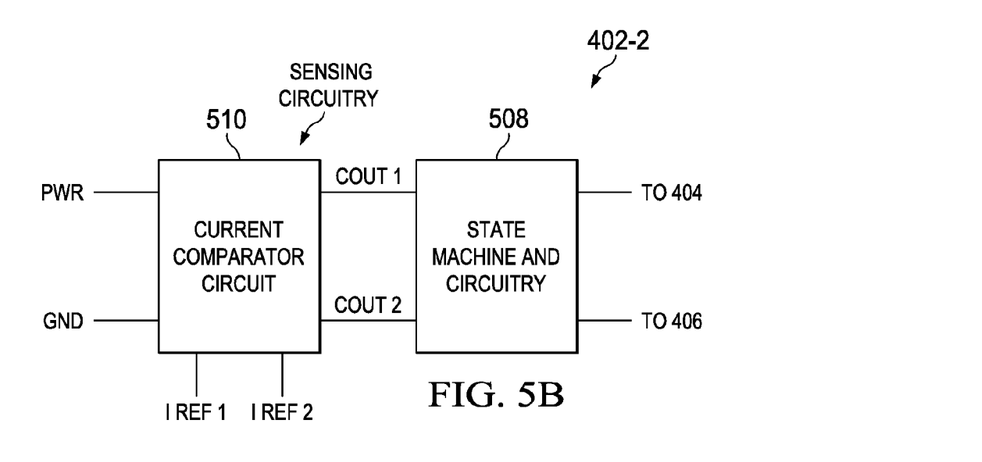

In FIG. 5B, another example configuration for the WSS analog sensing circuitry and state machine 402 can be seen (which is referred to as 402-2). WSS analog sensing circuitry and state machine 402-2 differs from WSS analog sensing circuitry and state machine 402-1 by the circuitry used to determine signals COUT1 and COUT2. In particular, WSS state machine 402-2 generally employs a current comparator circuit 510, which can provide a comparison in the current-domain. To do this, current comparator circuit 510 receives reference currents IREF1 and IREF2 (which correspond to current threshold values, such as 14 mA or 28 mA) and directly compares the current-domain signals to the reference currents IRE1 and IREF2.

Figure 6:
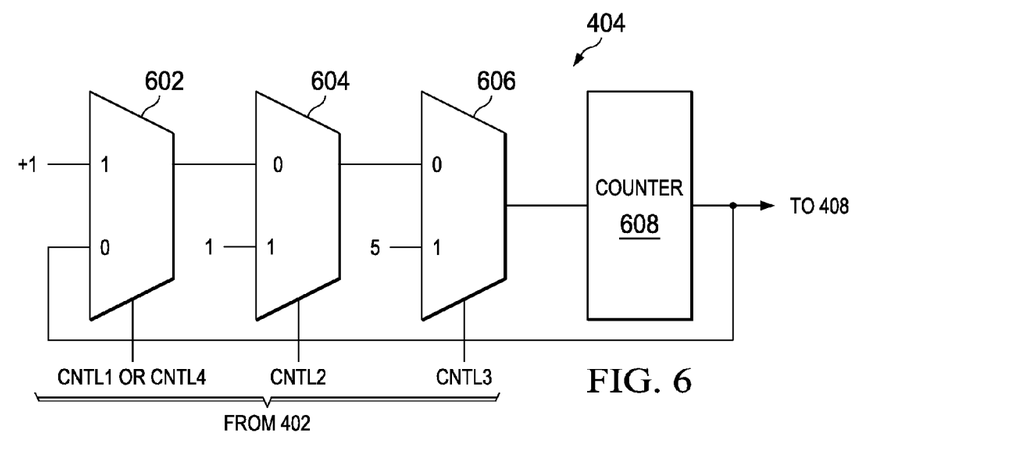
FIG. 6 is a block diagram of an example of the pulse width counter of FIG. 4.

Turning to FIG. 6, an example configuration for pulse width counter 404 can be seen. Pulse width counter 404 generally comprises multiplexers or muxes 602, 604, and 606 and a counter 608 (which is generally an 8-bit counter operating at a few megaherts). In operation, the WSS analog sensing circuitry and state machine 402 provides control signals CNTL1, CNTL2, CNTL3, and CNTL 4 to pulse width counter 404 to control the operation of pulse width counter 404. Typically, control signals CNTL1, CNTL2, CNTL3, and CNTL 4 respectively correspond to a rising edge of wheel speed pulse or low threshold (i.e, 14 mA), to a data preload, the falling edge of the wheel speed pulse or high threshold (i.e., 28 mA), and to a data bit edge detection. Thus, pulse width counter 404 begins counting on the rising edge of a wheel speed pulse (i.e., control signal CNTL1 is asserted), and, after the falling edge of the wheel speed pulse is detected (i.e., control signal CNTL 3 is asserted), the counter 608 is preloaded with a value of 5. For each data bit (which begins with the assertion of control signal CNTL4), the counter is preloaded with a value of 1 for each data bit.

Figure 7:
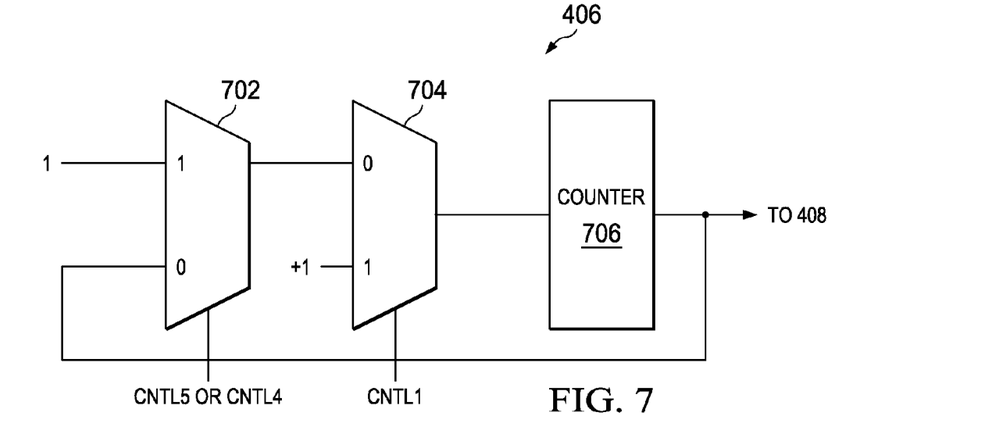
FIG. 7 is a block diagram of an example of the error counter of FIG. 4.

In FIG. 7, an example configuration for the error counter 406 can be seen. Error counter 406 generally comprises muxes 702 and 704, and counter 706 (which is generally a 4-bit counter). In operation, the WSS analog sensing circuitry and state machine 402 provides control signals CNTL1, CNTL4, and CNTL5 to the error counter 406, where control signal CNTL5 indicates a reset or new frame. As with the pulse width counter, error counter 406 begins counting on the rising edge of a wheel speed pulse (i.e., control signal CNTL1 is asserted). After the falling edge of the wheel speed pulse, the error counter 406 stops counting. Additionally, for each new frame or detection of a data bit edge, the counter 706 is preloaded with a value of 1.

Figure 8:
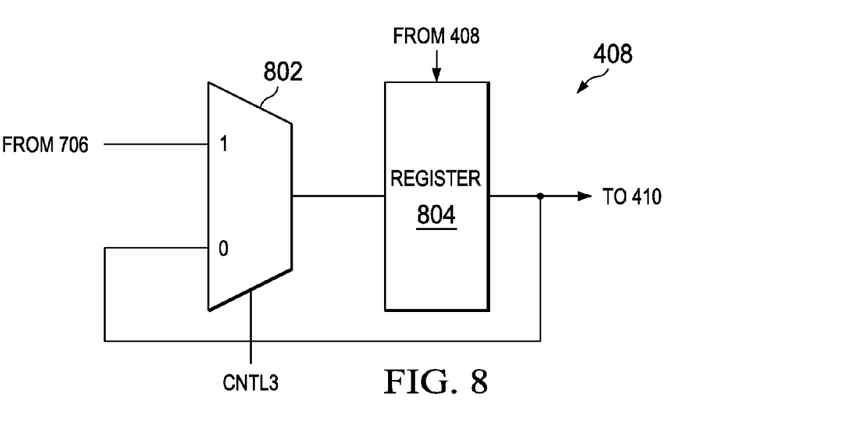
FIG. 8 is a block diagram of an example of the pulse width calculator of FIG. 4.

Turning now to FIG. 8, an example configuration for pulse width calculator 408 can be seen. Pulse width calculator 408 generally comprises mux 803 and register 404. Similar to pulse width counter 404 and error counter 408, the WSS state machine controls the operation of the pulse width calculator 408. Preferably, the mux 408 operates to stop the counting of the error counter 406 on the falling edge of the wheel speed pulse so as to load an error value into register 408. Register 408 also receives a pulse width value from pulse width calculator so as to calculate a speed pulse width.

Figure 9:
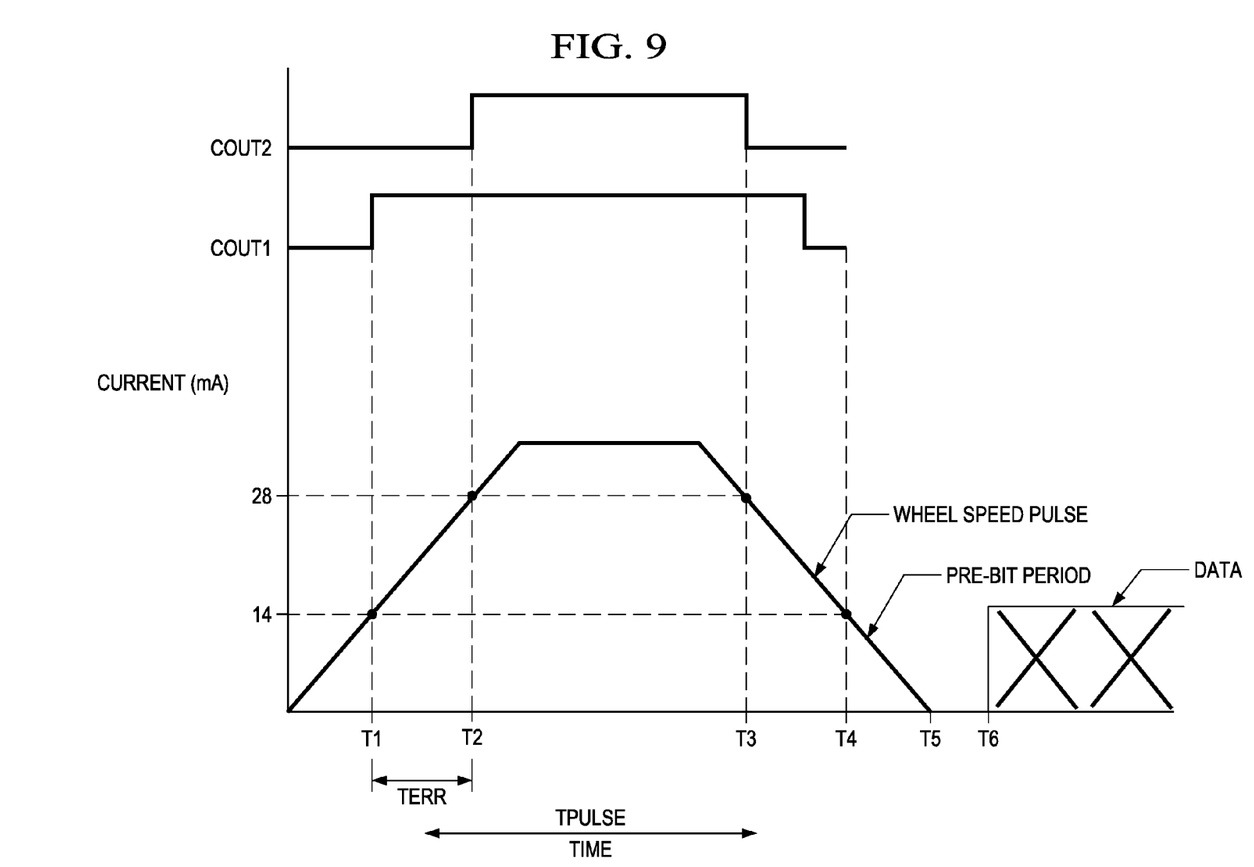
FIG. 9 is a timing diagram illustrating the operation of the MSC of FIG. 4.

Looking to FIG. 9, a timing diagram showing the general operation of MSC 400 can be seen. Typically, a WSS (i.e., WSS 102-1) produces square wave outputs (i.e., wheel speed pulses), but, as shown, a wheel speed pulse received by MSC 400 is not a square wave, but, instead, has a considerable about of error due to several factors. Namely, wiring parasitics as well as decoupling caps introduce the slew to these square wave outputs. However, WSS (i.e., WSS 102-1) generates the time base independent of the errors and the datastream is dependent on that timebase. Preferably, the WSS analog sensing circuitry and state machine 402 receives this wheel speed pulse and generates COUT1 and COUT2 based on a comparison of the wheel speed pulse to threshold values using reference voltages VREF1 and VREF2 or reference currents IREF1 and IREF2. Thus, signal COUT1 is logic high or "1" for the period between times t1 and t4, where the wheel speed pulse is greater than the low threshold (i.e., 14 mA), and signal COUT2 is logic high or "1" for the period between times t2 and t3, where the wheel speed pulse is greater than the high threshold (i.e., 28 mA). So, when signal COUT1 is asserted (at time t1), WSS state machine asserts control signal CNTL1 so that the pulse width counter 408 and error counter 406 begin incrementing because muxes 602 and 704 are selected to increment their respective count values. At time t3, signal COUT1 (which was asserted beginning at time t2) is de-asserted so that WSS analog sensing circuitry and state machine 402 asserts control signal CNTL3 and that the value from counter 608 is provided to register 804. The count value from counter 608 generally corresponds to the pulse width between times t1 and t2, and the count value from the counter 706 generally corresponds to one-half of the error TERR (between times t1 and t2). The pulse width (count value from counter 608) then subtracted from one-half of the error TERR to calculate the speed pulse width TPULSE (which is typically on the order of about 50 μs).

Following the wheel speed pulse, there is a pre-bit period (between times t5 and t6) and data. Typically, the pre-bit period is about one-half of the speed pulse width TPULSE in length, but because a pre-bit period been observed to be less than one-half of the speed pulse width TPULSE, counter 608 is preloaded with a value of 5 (by assertion of control signal CNTL3) to compensate for the loss. Each data bit (typically eight) is then transmitted (which is controlled through the assertion of signal CNTL2), and because data bit periods (which are each supposed to be about the speed pulse width TPULSE in duration) are observed to be less than the speed pulse width TPULSE, a value of 1 is preloaded into counter 608 through the assertion of signal CNTL4 to compensate for the error.

As a result of having MSC 400, several advantages can be realized. For example, increased accuracy in the measurement of the wheel speed sensor pulse width reduces errors in the time base measurements, which leads to more accurate data transmission. Another example is that MSC 400 accounts for capacitive changes and driving current difference that occur due to aging, offering a more robust solution.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a power terminal;
   sensing circuitry that is coupled to the power terminal, wherein the sensing circuitry receives a plurality of sensor signal pulses through the power terminal, wherein the sensor signal pulses are in the current-domain;
   a state machine that is coupled to the sensing circuitry, wherein the state machine and sensing circuitry compare a sensor signal pulse of the plurality of sensor signals pulses to a plurality of thresholds to generates first control signal and a second control signal;
   a pulse width counter that is coupled to the state machine, wherein the pulse width counter determines a width of the sensor signal pulse based at least in part on at least one of the first and second control signals;
   a error counter that is coupled to the state machine, wherein the error counter determines an error in the width of the sensor signal pulse based at least in part on one of the first and second control signals; and a pulse width calculator that is coupled to the pulse width counter and the error counter, wherein the pulse width calculator determines a speed pulse width by removing at least a portion of the error from a pulse width count.

2. The apparatus of claim 1, wherein the plurality of thresholds further comprises a plurality of threshold voltages, and wherein the sensing circuitry further comprises:
   a current-to-voltage (I-to-V) converter that converts the sensor signal pulses into the voltage-domain from the current-domain; and
   a plurality of comparators that are each coupled to the I-to-V converter and that each receive at least one of the plurality of threshold voltages.

3. The apparatus of claim 1, wherein the plurality of thresholds further comprise a plurality of threshold currents, and wherein the sensing circuitry further comprises a current comparator circuit that receives the plurality of sensor signal pulses and each threshold current.

4. The apparatus of claim 1, wherein the pulse width counter further comprises:
   a plurality pulse width counter multiplexers coupled in series with one another in a sequence, wherein at least one of the plurality of pulse width counter multiplexers is controlled by the first control signal, and wherein at least one of the plurality of pulse width counter multiplexers is controlled by the second control signal; and
   a first counter that is coupled to the last first and last pulse width counter multiplexers of the sequence.

5. The apparatus of claim 4, wherein the first counter is an 8-bit counter.

6. The apparatus of claim 4, and wherein the sequence further comprises a first sequence, and wherein the error counter further comprises:
   a plurality of error counter multiplexers that are coupled in series with one another in a second sequence, wherein the first error counter multiplexer of the second sequence is coupled to the first counter, and wherein at least one of the plurality of error counter multiplexers is controlled by the first control signal; and
   a second counter that is coupled to the last error counter multiplexer of the second sequence.

7. The apparatus of claim 6, wherein the second counter is a 4-bit counter.

8. The apparatus of claim 6, wherein the pulse width calculator further comprises:
   a pulse width calculator multiplexer that is coupled to the second counter and controlled by the second control signal; and
   a register that is coupled to the pulse width calculator multiplexer and the first counter.

9. An apparatus comprising:
   a plurality of wheel speed sensors, wherein each wheel speed sensor has a power terminal and a ground terminal, and wherein each of the wheel speed sensors is adapted to generate a wheel speed pulse in the current-domain through its power terminal;
   a plurality of power cables, wherein each power cable is coupled to the power and ground terminals of at least one of the wheel speed sensors; and
   a mixed signal circuit having:
      a plurality of power terminals that are each coupled to at least one of the power cables so as to receive the wheel speed pulse from each wheel speed sensor;
      sensing circuitry that is coupled to each power terminal from the mixed signal circuit;
      a state machine that is coupled to the sensing circuitry, wherein the state machine and sensing circuitry compare each wheel speed pulse signal pulse to a plurality of thresholds to generates first control signal and a second control signal corresponding to each wheel speed pulse;
      a pulse width counter that is coupled to the state machine, wherein the pulse width counter determines width of each wheel speed pulse based at least in part on at least one of its first and second control signals;
      a error counter that is coupled to the state machine, wherein the error counter determines an error in the width each wheel speed pulse based at least in part on one of its first and second control signals; and
      a pulse width calculator that is coupled to the pulse width counter and the error counter, wherein the pulse width calculator determines a speed pulse width for each wheel speed pulse by removing at least a portion of its error from its pulse width count.

10. The apparatus of claim 9, wherein the plurality of thresholds further comprises a plurality of threshold voltages, and wherein the sensing circuitry further comprises:
    an I-to-V converter that converts each wheel speed pulse into the voltage-domain from the current-domain; and
    a plurality of comparator that are each coupled to I-to-V converter and that each receive at least one of the plurality of threshold voltages.

11. The apparatus of claim 9, wherein the plurality of thresholds further comprise a plurality of threshold currents, and wherein the sensing circuitry further comprises a current comparator circuit that receives each wheel speed pulse and each threshold current.

12. The apparatus of claim 9, wherein the pulse width counter further comprises:
    a plurality pulse width counter multiplexer coupled in series with one another in a sequence, wherein at least one of the plurality of pulse width counter multiplexers is controlled by the first control signal of an associated wheel speed pulse, and wherein at least one of the plurality of pulse width counter multiplexers is controlled by the second control signal of an associated wheel speed pulse; and
    a first counter that is coupled to the last first and last pulse width counter multiplexers of the sequence.

13. The apparatus of claim 12, wherein the first counter is an 8-bit counter.

14. The apparatus of claim 12, and wherein the sequence further comprises a first sequence, and wherein the error counter further comprises:
    a plurality of error counter multiplexers that are coupled in series with one another in a second sequence, wherein the first error counter multiplexer of the second sequence is coupled to the first counter, and wherein at least one of the plurality of error counter multiplexers is controlled by the first control signal of an associated wheel speed pulse; and
    a second counter that is coupled to the last error counter multiplexer of the second sequence.

15. The apparatus of claim 14, wherein the second counter is a 4-bit counter.

16. The apparatus of claim 14, wherein the pulse width calculator further comprises:
    a pulse width calculator multiplexer that is coupled to the second counter and controlled by the second control signal of an associated wheel speed pulse; and
    a register that is coupled to the pulse width calculator multiplexer and the first counter.

17. A method comprising:
receiving a signal that is in the current-domain;
comparing the signal to a first threshold and a second threshold;
starting a first counter and a second counter when the signal becomes greater than the first threshold;
stopping the second counter when the signal becomes greater than the second threshold to generate an error in a pulse width;
stopping the first counter when the signal becomes when falls below the second threshold to generate the pulse width; and
determining a speed pulse width by removing the error from the pulse width.

18. The apparatus of claim 17, wherein the first and second thresholds further comprise first and second threshold voltages, respectively, and wherein the step of comparing further comprises converting the signal from the current-domain to the voltage domain.

19. The apparatus of claim 17, wherein the first and second thresholds further comprise first and second threshold currents, respectively.

20. The method of claim 17, wherein the pre-loading the first counter with a predetermined value following the step of stopping the first counter.

21. The method of claim 17, wherein the first threshold corresponds to 14 mA, and wherein the second threshold corresponds to 28 mA.

* * * * *